(No Model.)
E. PENNEY.
STEAM GANG PLOW.
No. 316,390. Patented Apr. 21, 1885.
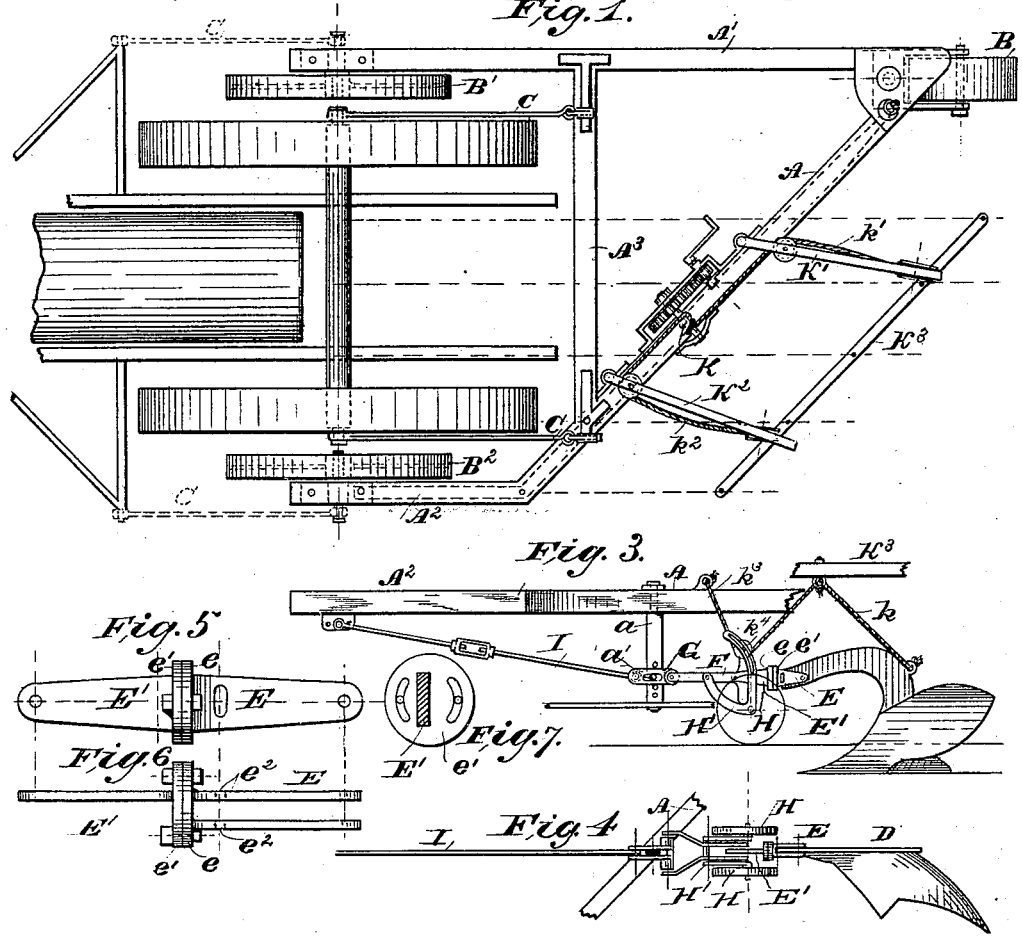
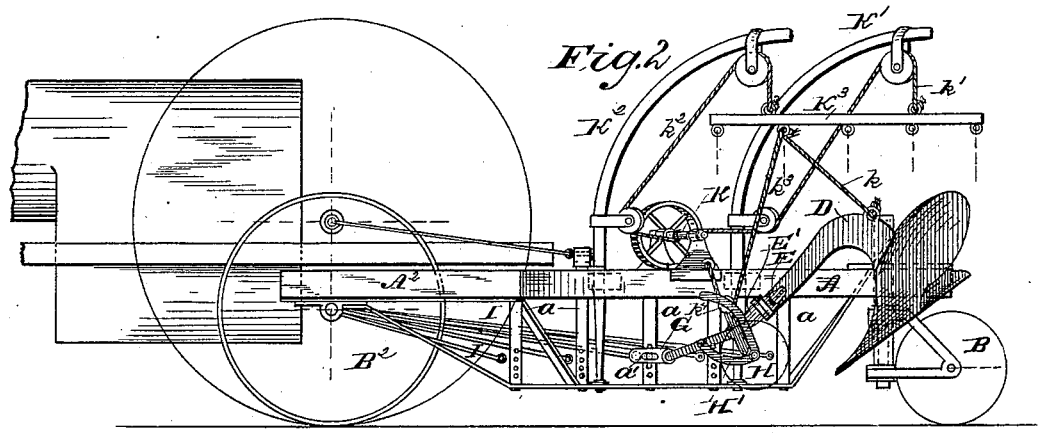
Witnesses:
E. J. Walker
W. W. Mortimer
Inventor:
Edgar Penney

UNITED STATES PATENT OFFICE.

EDGAR PENNEY, OF WAYNESBOROUGH, PENNSYLVANIA.

STEAM GANG-PLOW.

SPECIFICATION forming part of Letters Patent No. 316,390, dated April 21, 1885.

Application filed October 14, 1884. (No model.)

*To all whom it may concern:*

Be it known that I, EDGAR PENNEY, a citizen of the United States, residing at Waynesborough, in the county of Franklin and State of Pennsylvania, have invented certain new and useful Improvements in Steam Gang-Plows; and I do hereby declare the following to be a full, clear, and exact description of the invention, such as will enable others skilled in the art to which it appertains to make and use the same.

This invention relates to a gang-plow specially adapted to be drawn by a traction-engine.

My improvement consists in constructing the frame of the gang-plow with a forked forward end adapted to receive the rear end of the traction-engine, so that this forked forward end of the frame can be supported on ordinary wheels running by the side of the rear or traction wheels of the engine.

It further consists of certain combinations of mechanical devices, which combinations are specifically pointed out in claims at the close of this specification, and the practical application and *modus operandi* of which can be clearly understood from the following detailed description, aided by the annexed drawings.

Figure 1 is a plan view illustrating my improved gang-plow as applied to the rear end of a traction-engine, the plows being omitted from the figure, but their positions being indicated by broken lines. Fig. 2 is a side elevation thereof, showing one of the plows as it appears when raised clear of the ground. Figs. 3 to 7 illustrate details specially referred to hereinafter.

The same letters of reference indicate identical parts in all the figures.

The main frame of the gang-plow consists of the rear diagonal hitching-beam, A, the parallel side beams, A' and A², and the cross-beam A³. The forward ends of the side beams are disconnected so as to form a fork in front of the cross-beam, and the space between the side beams is of ample width to admit of the rear end of a traction-engine, as clearly shown in Fig. 1. The rear end of the frame is supported upon a caster-wheel, B, placed at the junction of the hitching-beam and side beam A'. The forward end of side beam A' is supported upon a wheel, B', running loose on a stud secured to the beam. The forward end of side beam A² is supported upon a similar wheel, B². The frame thus independently supported may be coupled to the traction-engine by any suitable means, which may consist of a pair of draw-bars, C C, connecting the frame either with the rear axle of the traction-engine, as shown in full lines in Fig. 1, or with a cross-bar of the traction-engine in front of the rear axle, as shown in dotted lines in Fig. 1; but whatever mode and means of coupling are used, the frame should be so connected that a line drawn through the axes of wheels B' and B² will be in about the vertical plane of the axis of the traction-wheels of the traction-engine. So arranged, the ordinary wheels B' B², described and shown, will answer for supporting the forward end of the gang-plow frame independent of the traction-engine, for the same reasons that permit the use of the ordinary traction-wheels for the support of the rear end of the traction-engine, whereas if the front supporting-wheels of the frame were any considerable distance in rear of the axis of the traction-wheels, such front supporting-wheels would have to be caster-wheels. The use of the ordinary wheels B' B² has the obvious advantage that they may be of large diameter.

The diagonal hitching-beam A is trussed somewhat like the diagonal hitching-beam described in my application for a United States patent filed October 14, 1884, bearing Serial No. 145,489; but in this case the plows are connected with the struts *a* of the truss by the following devices: Each plow-beam is provided at its forward end with an extension consisting of the fork E, constructed with a circular head, *e*, and a flat stem or shank, E', also constructed with a circular head, *e'*. The heads *e* and *e'* are bolted together by bolts passing through curved slots, (clearly shown in Fig. 7,) so that the fork E can be canted in one direction or the other by turning it on its longitudinal axis on the shank E'. The fork E of this extension is bolted to the plow-beam, and the canting just mentioned will have the effect of throwing the plow more or less into land. The flat shank of the plow-beam extension is connected by a coupling-link, F, to the clip G on one of the struts *a* of the trussed hitching-beam. The coupling-link is suitably forked at its forward end to embrace the cross-bar of the clip, as shown in Fig. 4, and may be made of right and left bars suitably connected together, and constructed each with a vertical cross-bar at the rear end, between which cross-bars the flat shank of the plow-beam extension will be guided.

In order to support the forward end of the plow-beam at any required height from the ground, I provide a gage-wheel, or a pair of gage-wheels, H, journaled on a yoke, H', which is pivoted to link F and secured thereto by a clamping-bolt passing through a curved slot in the yoke, as shown in Figs. 2 and 3, so that the yoke and gage-wheel may be raised and lowered as may be required.

The clip G is supported by a cross pin or bolt, a', of the strut a, the strut being constructed with a vertical series of pin-holes, so that the clip may be adjusted up and down by changing the bolt a' from one hole to another. The clip is slotted longitudinally, so that it may slide on the pin a'. The draft is applied to the clips by draft-rods I, one end of which, in the example illustrated, is designed to be connected at its forward end to the frame-bar $A^2$, while the rest are designed to be connected to the frame of the traction-engine.

The following hoisting devices are used for raising and lowering the plows: The rear ends of the plows are connected, each by a separate rope or chain, $k$, with a diagonal lifting-bar, $K^3$, suspended by two ropes or chains, $k'\ k^2$, from sheaves on the upper ends of two crane-posts, K' K², which are supported on and secured to the trussed hitching-beam A. The ropes $k'\ k^2$ pass under guide-pulleys to the winding-shaft K of a suitable windlass mounted on the hitching-beam. The forward end of each plow is connected with the lifting-bar $K^3$ by what I term a "loop rope" or "chain," $k^3$, because the front end of the plow when lifted is supported in a loop of said rope. It may be an extension of rope or chain $k$ beyond where the latter is secured to the lifting-bar. This rope $k^3$ passes from the lifting-bar to and under a sheave, $k^4$, (conveniently mounted in this instance on the coupling-link F,) and thence to a point on the hitching-beam A, where it is fastened. The lengths of the ropes $k$ and $k^3$ are such that the ropes $k$ will have more slack than ropes $k^3$ when the plows are at work, so that on raising the lifting-bar the front end of the plow will be lifted some, giving the plow-share an upward pitch, so as to cause it to run up out of the soil as the plow is drawn along before the rear end of the plow begins to be lifted. On the other hand, the rear end of the plows is lifted faster and through a greater space than the front end, as required. If necessary, suitable compound systems of sheaves may be associated with the ropes or chains $k^3$, to properly proportion the indirect lift of the front ends of the plows to the direct lift of their rear ends.

In order to give a firm support to the crane-posts, I extend them downward from the points where they are connected to the beam A, and step their lower ends on the lower chord of the truss of said beam, as clearly shown in Fig. 2.

The fork E of the plow-beam extension is arranged eccentrically to its circular head $e$, and shank E' is arranged eccentrically to its circular head $e'$. By giving the extension, as a whole, a half-turn, or by giving to either part thereof a half-turn on the other, will effect a lateral adjustment of fork E (to which the plow-beam is secured) with reference to the coupling-link. By this means the distance between the plows may be changed at will.

I claim as my invention—

1. The described self-supported main frame of a gang-plow designed to be drawn by a traction-engine, the distinguishing characteristic of which frame consists in being forked at the front and having said forked end supported on ordinary wheels, (not caster-wheels,) the axis of which lies in the vertical plane, or thereabout, of the axis of the rear axle of the traction-engine when applied thereto, substantially as before set forth.

2. The combination, substantially as before set forth, of the draft-rod, the slotted clip supported on the strut of the truss of the diagonal hitching-beam, the coupling-link carrying an adjustable gage-wheel, and the extension on the end of the plow-beam, which extension consists of two parts, one adjustable on the other, for canting the plow.

3. The combination, substantially as before set forth, of the diagonal lifting-bar, the ropes for connecting the rear ends of the plows with the lifting-bar, and the loop ropes or chains for connecting the front ends of the plows with the lifting-bar.

4. The combination, substantially as before set forth, of the draft-rod, the slotted clip supported on the strut of the truss of the diagonal hitching-beam, the coupling-link, and the plow-beam.

5. The combination, substantially as before set forth, of the coupling-link, the plow-beam, and the extension for connecting the plow-beam to the coupling-link, said extension consisting of two parts, the shank of one and fork of the other of which are respectively eccentric to their circular heads, so that by giving a half-turn to either or both said parts of the extension the plow-beam may be shifted laterally with reference to the coupling-link.

6. The combination, substantially as before set forth, of the diagonal hitching-beam, the two crane-posts secured thereto, the hoisting-ropes, and the windlass located on said hitch-beam at a point between the crane-posts.

In testimony whereof I affix my signature in presence of two witnesses.

EDGAR PENNEY.

Witnesses:
S. M. STOLER,
A. H. CAMPBELL.